United States Patent
Kim (10) Patent No.: US 9,849,884 B2
(45) Date of Patent: Dec. 26, 2017

(54) HILL START ASSIST CONTROL METHOD AND SYSTEM FOR VEHICLES

(71) Applicant: Hyundai Motor Company, Seoul (KR)

(72) Inventor: In Su Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/190,558

(22) Filed: Jun. 23, 2016

(65) Prior Publication Data

US 2017/0166210 A1    Jun. 15, 2017

(30) Foreign Application Priority Data

Dec. 9, 2015   (KR) .................. 10-2015-0174784

(51) Int. Cl.
| | | |
|---|---|---|
| *G06F 7/00* | (2006.01) | |
| *B60W 30/18* | (2012.01) | |
| *B60W 40/076* | (2012.01) | |

(52) U.S. Cl.
CPC .... *B60W 30/18118* (2013.01); *B60W 40/076* (2013.01); *B60W 2510/18* (2013.01); *B60W 2550/142* (2013.01); *B60W 2710/182* (2013.01)

(58) Field of Classification Search
CPC ................ B60W 30/18118; B60W 40/076
USPC .......................................................... 701/70
See application file for complete search history.

(56) References Cited

U.S. PATENT DOCUMENTS

| | | | | |
|---|---|---|---|---|
| 6,549,840 B1* | 4/2003 | Mikami | ................. | B60K 6/365 180/243 |
| 9,610,928 B2* | 4/2017 | Kinoshita | ............... | B60T 8/245 |
| 2002/0046892 A1* | 4/2002 | Sakakiyama | .......... | B60K 17/35 180/242 |
| 2003/0111896 A1* | 6/2003 | Imamura | ................. | B60T 8/172 303/11 |
| 2003/0111900 A1* | 6/2003 | Inoue | ........................ | B60T 8/36 303/166 |
| 2007/0228823 A1* | 10/2007 | Kokubo | .................... | B60T 7/22 303/155 |
| 2008/0004780 A1* | 1/2008 | Watanabe | ................ | B60K 6/40 701/54 |
| 2013/0110370 A1* | 5/2013 | Inomata | ............. | B60K 31/0008 701/70 |
| 2016/0009262 A1* | 1/2016 | Kinoshita | ............. | B60T 13/146 303/159 |
| 2016/0075316 A1* | 3/2016 | Kinoshita | ............... | B60T 7/042 701/70 |

FOREIGN PATENT DOCUMENTS

| | | |
|---|---|---|
| JP | 2012-111373 A | 6/2012 |
| JP | 5079577 B2 | 11/2012 |

(Continued)

*Primary Examiner* — Muhammad Shafi
(74) *Attorney, Agent, or Firm* — Mintz Levin Cohn Ferris Glovsky and Popeo, P.C.; Peter F. Corless (57) ABSTRACT

A hill start assist control (HAC) method and system for vehicles is provided to prevent malfunction and sensitive operation of an HAC function, generated due to misrecognition of a flat road as a hill when the vehicle is accelerated after braking on the flat road, caused by use of a value sensed by an acceleration sensor in determination of a hill. For this purpose, a corrected gradient, in which a tilt of the vehicle in the pitch direction is reflected in a gradient acquired from the value sensed by the acceleration sensor, is used as an actual road gradient value.

20 Claims, 6 Drawing Sheets

(56) References Cited

FOREIGN PATENT DOCUMENTS

| JP | 5495027 B2 | 5/2014 |
| KR | 10-2007-0065031 A | 6/2007 |
| KR | 2011-0052036 A | 5/2011 |
| KR | 10-2011-0125128 A | 11/2011 |
| KR | 2011-0125128 | * 11/2011 |
| KR | 2012-0098287 A | 9/2012 |
| KR | 2013-0138013 A | 12/2013 |

* cited by examiner

FIG. 1
PRIOR ART

BRAKE OF VEHICLE (NOSE DIVE)

FIG. 2A
PRIOR ART

ACCELERATION OF VEHICLE (NOSE UP)

HILL START ASSIST CONTROL METHOD AND SYSTEM FOR VEHICLES

CROSS-REFERENCE TO RELATED APPLICATION

This application claims under 35 U.S.C. §119(a) the benefit of priority to Korean Patent Application No. 10-2015-0174784 filed on Dec. 9, 2015, the entire contents of which are incorporated herein by reference.

BACKGROUND (a) Technical Field

The present disclosure relates to a hill start assist control method and system for vehicles, and more particularly, to a hill start assist control (HAC) method and system for vehicles that prevent malfunction and sensitive operation of an HAC function generated due to misrecognition of a flat road as a hill when the vehicle is accelerated after braking on the flat road.

(b) Background Art

In general, to stop a vehicle on a hill (e.g., an uphill road) and to then restart the vehicle, a driver releases a brake pedal and engages an accelerator pedal and, at this time, when driving force is insufficient, the vehicle moves backwards, i.e., in the downward direction of the hill. Therefore, hill start assist control (hereinafter, referred to as "HAC") has been proposed, in which, when a vehicle stopped on a hill is started, a brake device provides braking force to respective vehicle wheels to prevent the vehicle from moving backwards.

Such HAC is a function of applying braking force to respective vehicle wheels before driving torque enough to prevent a vehicle from moving backwards is generated from a power unit of the vehicle, and then releasing the braking force, when a driver recognizes a hill (e.g., when the hill is detected) and an accelerator pedal is engaged. The HAC function is operated in a stopped state of the vehicle or in a brake off state of the vehicle in which a brake pedal is released (e.g., pressure is no longer exerted onto the pedal). Additionally, the HAC function is one of the additional functions of an electronic stability control (ESC) system which maintains liquid pressures (e.g., braking pressures) of wheel cylinders allowing an ESC hydraulic modulator to generate braking forces of wheel brakes before driving torque required for climbing a hill is generated, and thus prevents the vehicle from inadvertently moving backwards.

Further, to measure a gradient of a road and to detect whether the road is a flat road or a hill in an HAC system, a longitudinal acceleration sensor (G sensor) is used and a controller of the HAC system is configured to detect and recognize a hill having a designated gradient or more using an acceleration value sensed by the longitudinal acceleration sensor (hereinafter, referred to as "the acceleration sensor").

Figure 1:
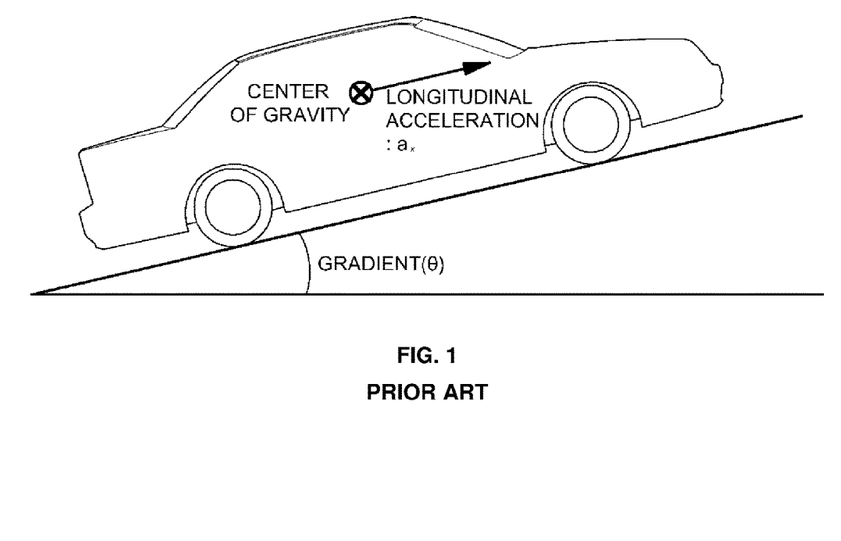
FIG. 1 is a view illustrating detection of a longitudinal acceleration when a vehicle is driven on a hill according to the related art.

Fundamentally, the acceleration sensor outputs 0 as an acceleration value sensed when a vehicle drives at a constant velocity on a flat road, outputs a positive (+) or negative (−) acceleration value when the vehicle accelerates or decelerates on a flat road, and outputs a positive (+) or negative (−) acceleration value when the vehicle drives at a constant velocity or stops on an uphill road or a downhill road, as exemplarily shown in FIG. 1 of the related art. The gradient (θ) of a road is an input in the operation of the HAC system. Whether the road is a flat road or a hill is determined by calculating the gradient of the road from a value sensed by the acceleration sensor, a necessary braking pressure is determined based on the gradient value when the gradient is greater than a set value, and liquid pressures (braking forces) of wheel cylinders are adjusted through a valve of the ESC modulator to track the braking pressure as a target value.

Figure 2A:
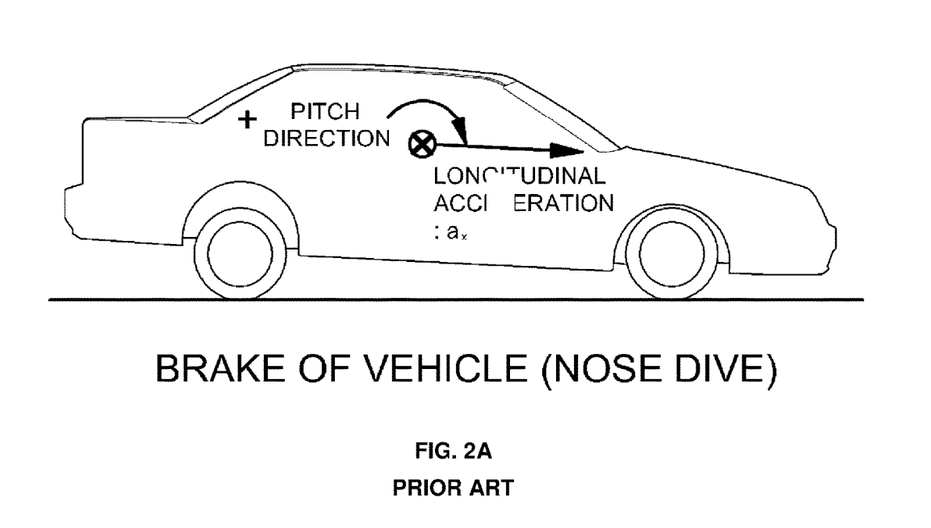
FIGS. 2A and 2B are views illustrating detection of a longitudinal acceleration due to behavior of a vehicle in the pitch direction when a brake pedal is disengaged after braking of the vehicle according to the related art.
Figure 2B:
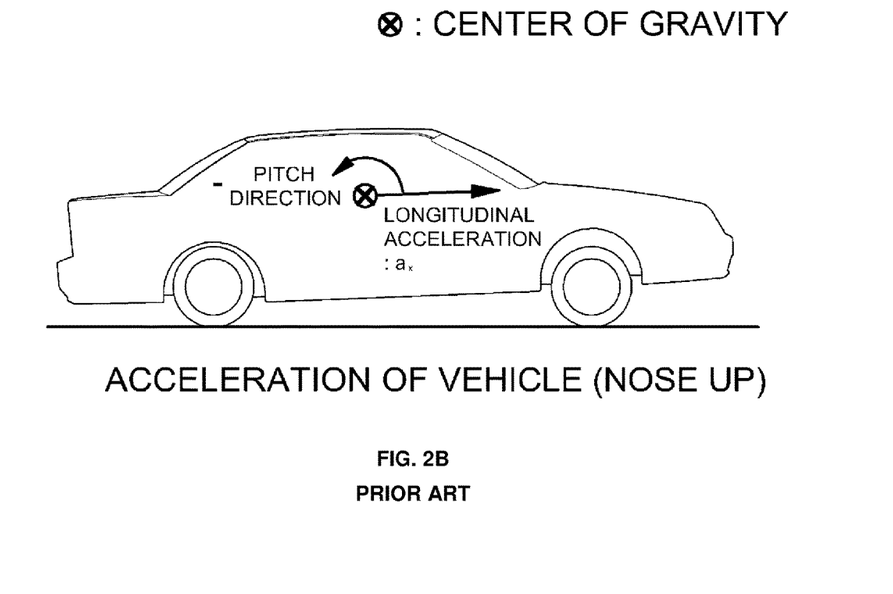

Additionally, the HAC malfunctions on a flat road more frequently than on a hill since when a brake pedal is engaged to suddenly brake a vehicle, nose dive is generated and, when the brake pedal is disengaged or the vehicle is accelerated after sudden braking, nose up is generated, and thus, the acceleration sensor outputs the same value as the value, which is output on a hill. In other words, when a vehicle is suddenly decelerated and then driven on a flat road, behavior of the vehicle in the pitch direction is generated, as exemplarily shown in FIGS. 2A and 2B of the related art, the flat road may be misrecognized as having a gradient and the HAC function may be unnecessarily operated.

In particular, even though the vehicle may be traveling on the flat road, the value sensed by the acceleration sensor may cause a determination that the vehicle is traveling on a hill and, thus, a valve actuator of the ESC hydraulic modulator may be operated to adjust liquid pressures of respective wheel brakes. Consequently, the hydraulic modulator may be operated on the flat road and, thus, the vehicle may be decelerated, noise caused by operation of the valve of the hydraulic modulator and noise caused by friction between a disc and a pad may be generated and the vehicle may be unstable.

SUMMARY

The present invention provides a hill start assist control method and system for vehicles which may prevent malfunction and sensitive operation of an HAC function generated due to misrecognition of a flat road as a hill, using a value sensed by an acceleration sensor in determination of a hill when the vehicle is accelerated after braking on the flat road.

In one aspect, the present invention provides a hill start assist control method for vehicles that may include acquiring vehicle state information in real time, determining whether a driver braking input is received based on the vehicle state information, calculating a braking deceleration of the vehicle generated by braking force from information regarding braking, upon determining that the driver braking input is received, determining a tilt of the vehicle in the pitch direction that corresponds to the calculated braking deceleration, calculating a gradient of a road from a longitudinal acceleration signal of the vehicle using the vehicle state information, adjusting the road gradient, calculated from the longitudinal acceleration signal, using the tilt of the vehicle in the pitch direction, determining whether HAC entrance conditions are satisfied using the corrected road gradient and the vehicle state information acquired in real time, and generating braking force to prevent the vehicle from moving backwards on a hill in response to determining that the HAC entrance conditions are satisfied.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

Figure 3:
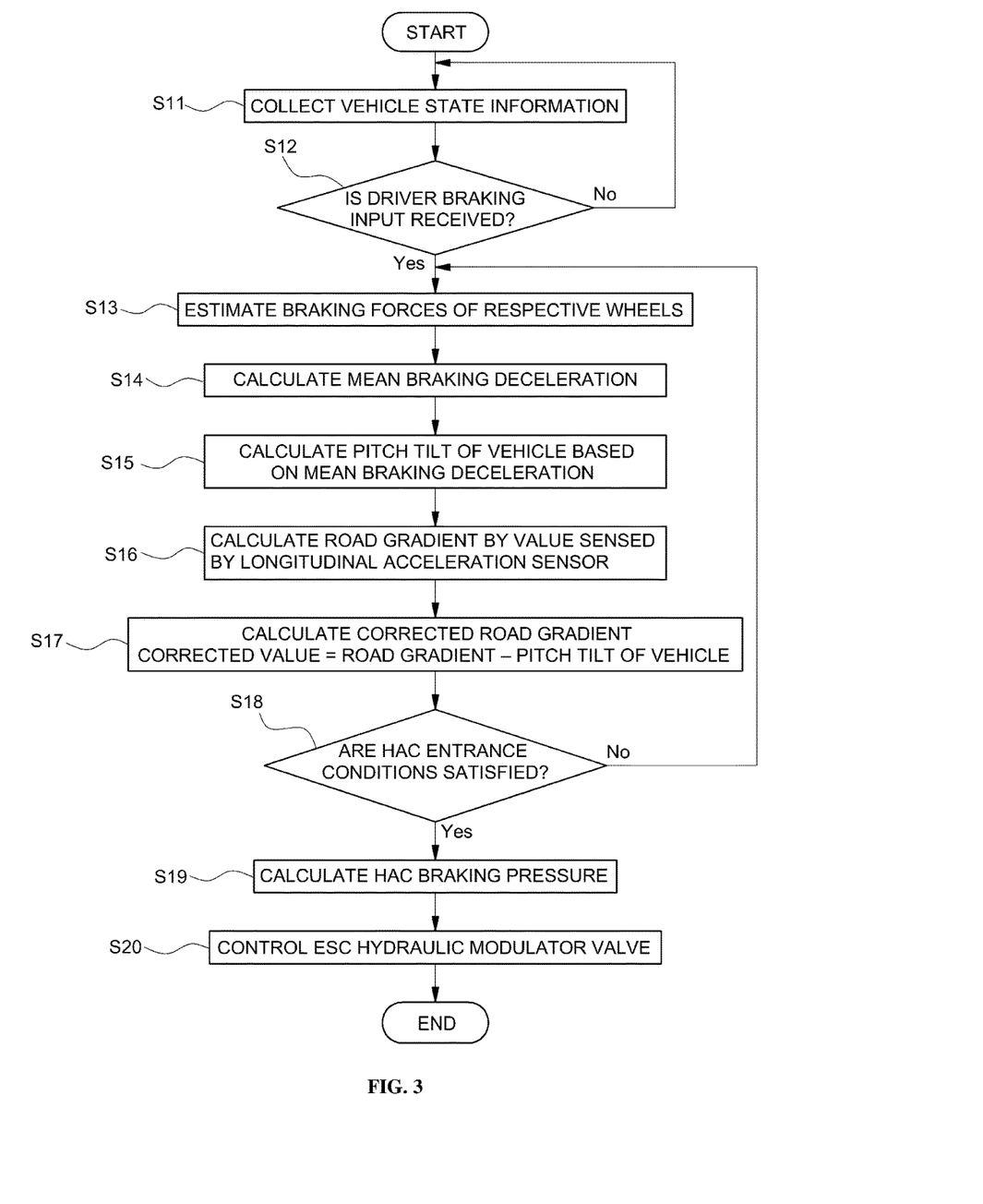
FIG. 3 is a flowchart illustrating a hill start assist control method in accordance with one exemplary embodiment of the present invention.

FIG. 3 is a flowchart illustrating a hill start assist control method in accordance with one exemplary embodiment of the present invention. In the present invention, vehicle state information may be acquired by respective detection units (e.g., sensors) installed within the vehicle, hill start assist control (HAC) may be performed, in which braking force of a brake device may be generated to prevent the vehicle from moving backwards when the vehicle is started under conditions that a hill has a gradient greater than a set value, under stopped state conditions of the vehicle, and under conditions that a brake pedal is disengaged (e.g., pressure is no longer exerted onto the brake pedal), based on the acquired vehicle state information.

However, in the hill start assist control method in accordance with the present invention, to overcome conventional problems, i.e., generation of malfunction and sensitive operation of the HAC function on a flat road due to using only a gradient determined from a value sensed by an acceleration sensor, the gradient value determined from the value sensed by the acceleration sensor may be adjusted using a tilt of the vehicle in the pitch direction and, in response to determining that a road is a hill having a gradient greater than a set value using the corrected gradient value, a target braking pressure that corresponds to the corrected gradient value may be determined, and generation of braking pressures of wheel cylinders and generation of braking force may be adjusted.

Figure 4A:
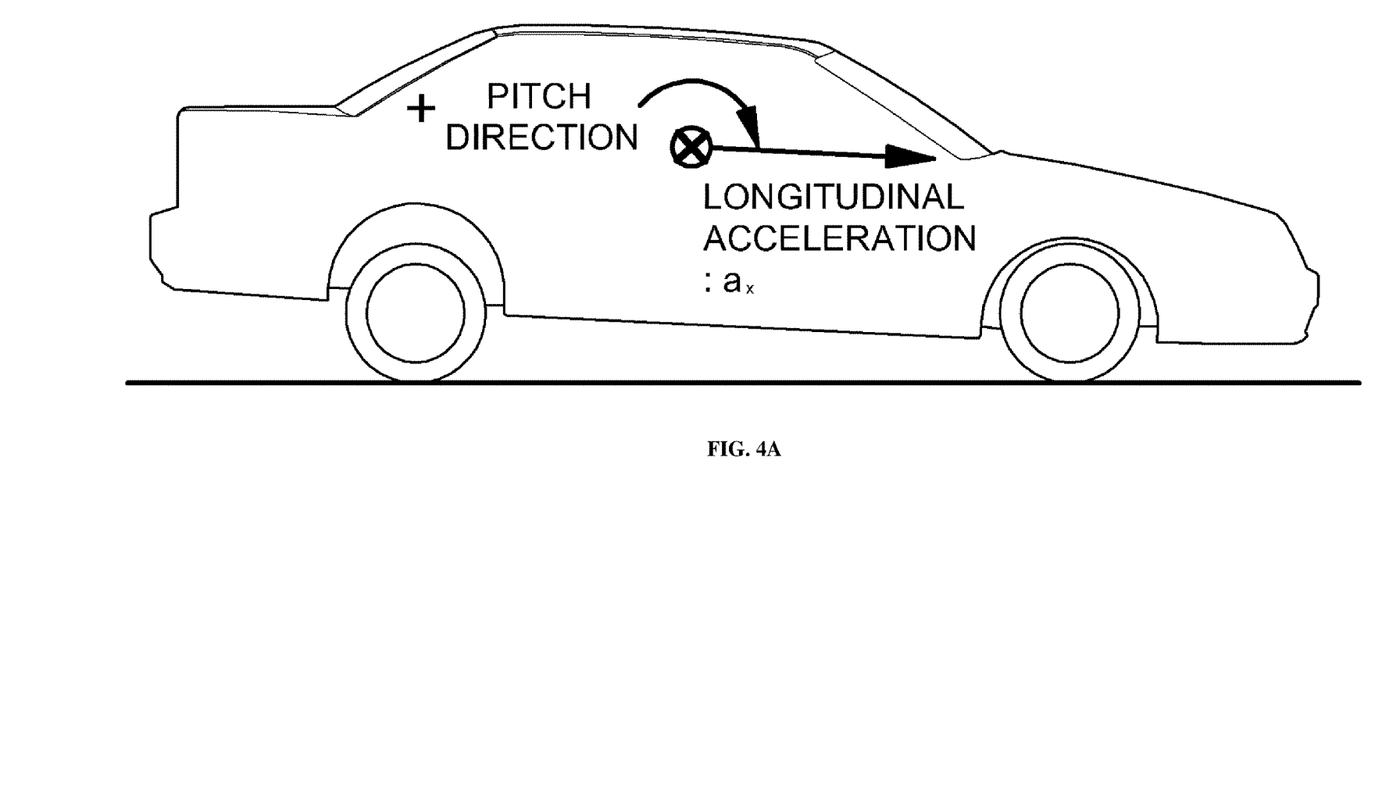
FIGS. 4A to 4C are views illustrating road gradients in which a tilt of a vehicle in the pitch direction in accordance with one exemplary embodiment of the present invention is reflected.
Figure 4B:
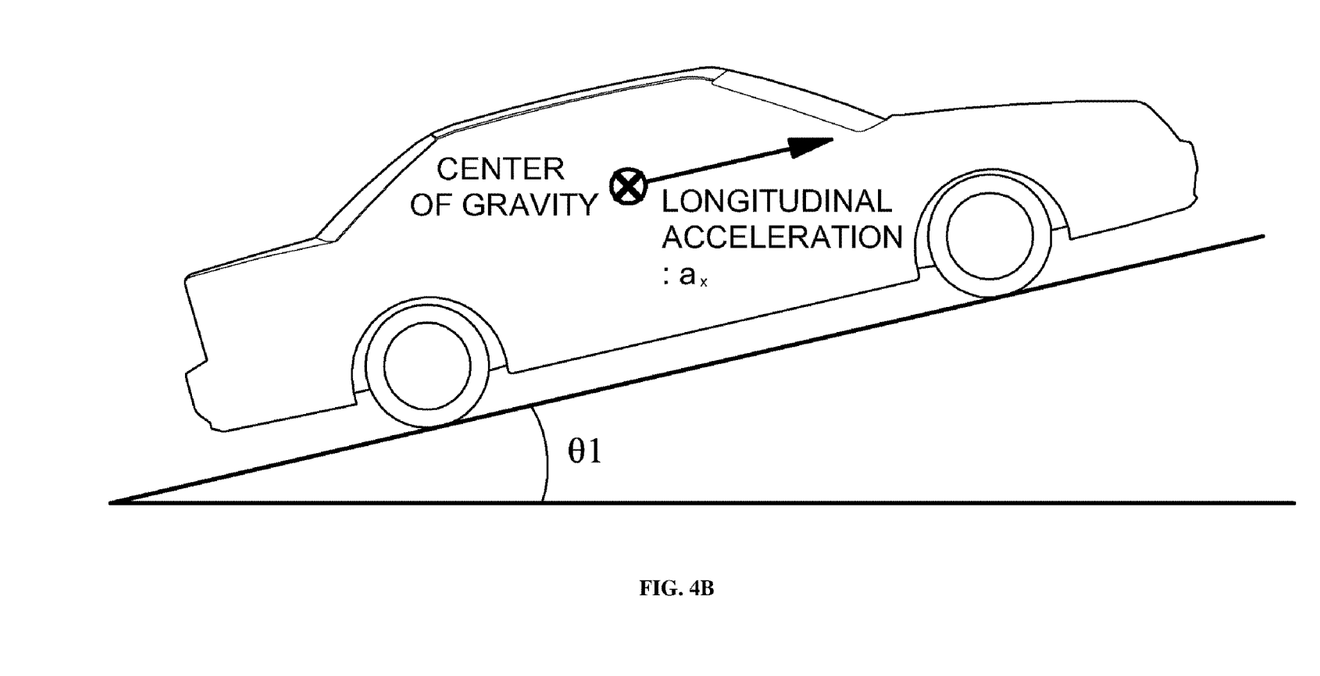
Figure 4C:
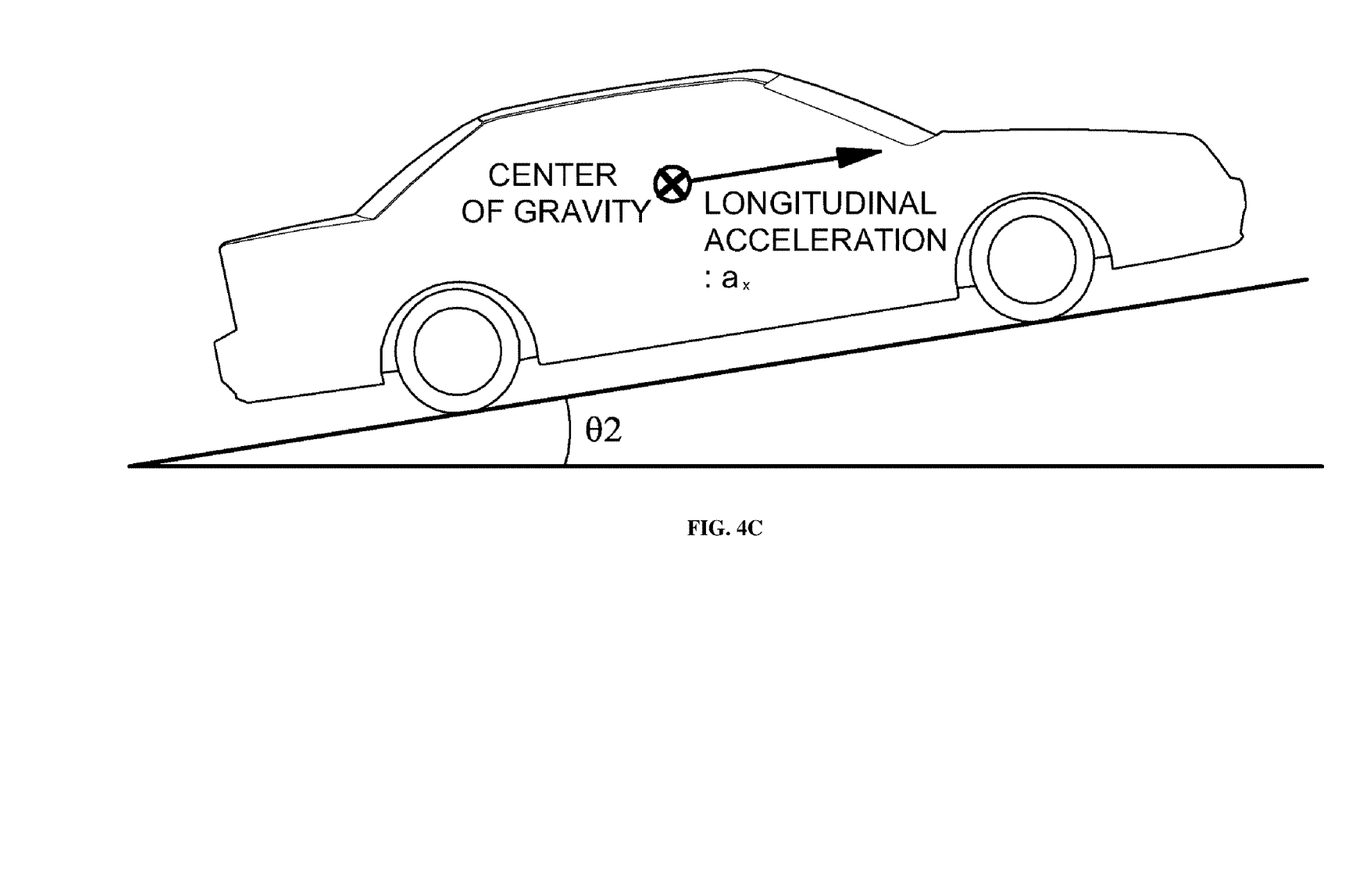

For reference, FIGS. 4A to 4C are views illustrating road gradients in which a tilt of a vehicle in the pitch direction (hereinafter, referred to as a "pitch tilt"), i.e., a gradient by a braking deceleration of the vehicle is reflected. In the present invention, a road gradient, in which a gradient by a braking deceleration of the vehicle (a pitch tilt) is reflected, may be calculated as "gradient by the value sensed by the acceleration sensor−gradient by the braking deceleration", and the calculated road gradient may be used to distinguish a flat road and a hill in an HAC process and used as input variables to determine braking pressure. In particular, a hill indicates a road having a gradient greater than the set value (e.g., a sloped road surface).

As exemplarily shown in FIG. 4A, when a vehicle being driven on a flat road is suddenly decelerated (e.g., pressure is suddenly exerted onto the brake pedal), vehicle behavior in the pitch direction occurs, and accordingly a road gradient in which the pitch tilt of the vehicle is reflected (0%, a gradient of a flat road) is less than the set value. In other words, the road gradient may be calculated as a value acquired by subtracting a gradient based on a braking deceleration of the vehicle (a deceleration of the vehicle by braking) from a gradient determined from the value sensed by the acceleration sensor (G sensor) and, when the calculated road gradient is used, malfunction and sensitive operation of the HAC function may be suppressed, as compared to the conventional method in which whether a vehicle enters HAC is determined using only a gradient determined from a value sensed by an acceleration sensor. For example, on the assumption that a gradient determined from the value sensed by the acceleration sensor is 0.1% and a gradient based on a braking deceleration of the vehicle (a pitch tilt of the vehicle) is 0.1%, a road gradient input to an HAC logic may be calculated as '0.1−0.1=0%'.

Further, as exemplarily shown in FIG. 4B, when a vehicle being driven on a hill is suddenly decelerated, vehicle behavior in the pitch direction may also occur and a road gradient (θ) may be calculated as a value acquired by subtracting a gradient based on a braking deceleration of the vehicle from a gradient determined from the value sensed by the acceleration sensor. For example, on the assumption that a gradient determined from the value sensed by the acceleration sensor is −0.2% and a gradient based on a braking deceleration of the vehicle is 0.1%, a road gradient input to the HAC logic may be calculated as '−0.2−0.1=−0.3%'.

Further, as exemplarily shown in FIG. 4C, when a vehicle being driven on a hill with a relatively small gradient is suddenly decelerated, vehicle behavior in the pitch direction may also occur and a road gradient (θ) may be calculated as a value acquired by subtracting a gradient based on a braking deceleration of the vehicle from a gradient determined from the value sensed by the acceleration sensor. For example, on the assumption that a gradient determined from the value sensed by the acceleration sensor is −0.1% and a gradient based on a braking deceleration of the vehicle is 0.1%, a road gradient input to the HAC logic may be calculated as '−0.1−0.1=−0.2%'.

Since a vehicle tilt due to vehicle behavior in the pitch direction may be reflected in a corrected road gradient, acquired by subtracting a gradient based on a braking deceleration of the vehicle from a gradient determined from the value sensed by the acceleration sensor, the corrected road gradient may denote a more accurate actual road gradient.

Hereinafter, a control process in accordance with the present invention will be described in detail with reference to FIG. 3. First, a controller may be configured to collect the vehicle state information detected by respective detection units (e.g., sensors) in real time (Operation S11). In particular, the vehicle state information may be known sensor signals and vehicle information necessary for HAC and may include a brake pedal signal that indicates the operation state of a brake pedal, a wheel speed signal, a vehicle speed signal, and a longitudinal acceleration signal of the vehicle.

Further, in the present invention, the vehicle state information may further include a hydraulic pressure generated from a master cylinder during braking, i.e., a master cylinder pressure, or a braking pressure generated from each wheel cylinder during braking, i.e., a wheel cylinder pressure. Such a wheel cylinder pressure may be detected by a pressure sensor installed on the wheel cylinder of each wheel of the vehicle, and the detected wheel cylinder pressure may be used to calculate the braking force of each wheel. Alternatively, when a pressure sensor is installed on the master cylinder, the pressure of each wheel cylinder may be estimated from the master cylinder pressure detected by the pressure sensor of the master cylinder and then may be used to estimate the braking force of each wheel. In addition, the vehicle state information may selectively further include operation information of a parking brake, a yaw rate signal of the vehicle (e.g., a signal from a yaw rate sensor), an acceleration pedal signal that indicates the position of an acceleration pedal, a throttle position signal, etc.

After Operation S11, the controller may be configured to determine whether driver brake input is received based on the collected vehicle state information, i.e., determine whether the brake pedal is engaged (e.g., operated by the driver) based on the brake pedal signal (Operation S12). Particularly, whether the brake pedal is operated may be determined from a signal from a brake pedal switch as the brake pedal signal and, when an on-signal from the brake pedal switch is input, the controller may be configured to determine that the brake pedal is operated (brake pedal On).

Further, in response to determining that the driver brake input is received in Operation S12, a deceleration of the vehicle generated by braking during generation of braking force may be calculated from information regarding braking using the vehicle state information acquired in real time. For this purpose, braking forces of respective wheels may be estimated (Operation S13) from liquid pressures generated from the wheel cylinders of respective wheel brakes during braking, i.e., braking pressures, as the information regarding braking. The braking pressures of the respective wheel cylinders may be detected by pressure sensors installed on the wheel cylinders.

Alternatively, when a pressure sensor is installed on the master cylinder, the pressures of the respective wheel cylinders may be estimated from the pressure of the master cylinder detected by the pressure sensor of the master cylinder (e.g., a hydraulic pressure generated from the master cylinder) and then may be used to estimate the braking forces of the wheel brakes. In other words, the braking forces of the respective wheel brakes may be estimated using the estimated pressure values of the respective wheel cylinders.

Methods for estimating pressures of the respective wheel cylinders from the pressure of the master cylinder, including a method for estimating pressures of the respective wheel cylinders from the pressure of the master cylinder through mathematical calculation in vehicle brake control, are known to those skilled in the art and a detailed description thereof will thus be omitted. Further, the braking forces of the respective wheel brakes may be calculated using wheel brake information including coefficients of friction of pads and radii of rotation of discs from pressure values detected by the pressure sensors of the wheel cylinders or pressure values estimated from the pressure of the master cylinder as the braking pressures of the wheel cylinders. Methods for calculating braking forces of the wheel brakes from the pressures of the wheel cylinders, including a method for calculating braking forces of the wheel brakes through mathematical calculation in vehicle brake control, are known to those skilled in the art and a detailed description thereof will thus be omitted.

Moreover, after the braking forces of the respective wheels are estimated, mean braking decelerations may be calculated using the estimated braking forces (Operation S14). Particularly, the mean braking decelerations may be calculated for a time starting from when the pressure of the master cylinder is generated after the driver brake input to operate the brake pedal is received to when the wheel speeds of the wheel speed sensors become 0. The overall mean braking deceleration of the vehicle at the center of gravity of the vehicle may be calculated based on the braking forces and the mean braking decelerations of the respective wheels and vehicle load distribution information since the acceleration sensor is installed at the center of gravity of the vehicle.

In particular, the braking forces of the respective wheels are moved to the center of gravity of the vehicle on a coordinate system and thus the overall mean braking deceleration of the vehicle at the center of gravity of the vehicle may be mathematically calculated. Thereafter, a tilt of the vehicle in the pitch direction, in which nose dive occurs due to influence of a deceleration during braking, i.e., a gradient by a braking deceleration (a pitch tilt of the vehicle), may be determined using the calculated overall mean braking deceleration of the vehicle (Operation S15).

The tilt of the vehicle in the pitch direction may be calculated from map data, in which pitch tilts according to mean braking decelerations are mapped, and a pitch tilt that corresponds to the calculated overall mean braking deceleration may then be acquired from the map data. Thereafter, a road gradient may be calculated from a longitudinal acceleration value sensed by the acceleration sensor after the vehicle stops (Operation S16), and the road gradient calculated from the sensed longitudinal acceleration value may be corrected (e.g., adjusted) using the pitch tilt (Operation S17). Particularly, an actual road gradient, i.e., a corrected gradient value, may be calculated by subtracting the pitch tilt from the road gradient calculated from the sensed longitudinal acceleration value, and whether HAC entrance conditions are satisfied may be determined using the calculated corrected gradient value as an input of the HAC entrance conditions (Operation S18).

As one example of HAC entrance and operation conditions, the HAC function may be set to be operated in the start-on state of the vehicle. A logic may be configured in which the HAC function to generate braking forces of the wheel brakes is executed when all of the start-on state of the vehicle, the off state of the parking brake, the off state of the acceleration pedal, a state in which the opening degree of the throttle is 0, the off state of the brake pedal (the off state of the brake pedal switch), the stopped state of the vehicle, a state in which the road gradient is greater than a set value, and a state in which no yaw rate of the vehicle is generated are satisfied.

The off state of the acceleration pedal may be determined from a signal (APS=0) from an accelerator position sensor (APS) as the acceleration pedal signal, and the state in which the opening degree of the throttle is 0 may be determined from a signal (TPS=0) from a throttle position sensor (TPS) as the throttle position signal. Further, the off state of the brake pedal (the off state of the brake pedal switch) denotes a state in which the driver brake input is released (e.g., the pedal is disengaged and pressure is no longer exerted onto the pedal) and may be determined from a signal of the brake pedal switch as the brake pedal signal, and the stopped state of the vehicle may be determined from a signal from a vehicle speed sensor or signals from wheel speed sensors as the vehicle speed signal.

Further, in the HAC entrance conditions, the road gradient may indicate a corrected value of the gradient, determined from the longitudinal acceleration signal of the vehicle, i.e., a signal from the acceleration sensor, using the gradient based on the braking deceleration (the pitch tilt). When the HAC entrance conditions are satisfied in Operation S18, a braking pressure to prevent the vehicle from moving backwards may be calculated using the actual road gradient, i.e., a difference between the road gradient calculated from the sensed longitudinal acceleration value and the pitch tilt (Operation S19). A process for calculating a target braking pressure using the road gradient is the same as a process in conventional HAC, which is known to those skilled in the art, and a detailed description thereof will thus be omitted. Thereafter, using the calculated braking pressure as a target value, the controller may be configured to adjust the pressures of the wheel cylinders for generating braking force to reach the target value through an ESC hydraulic modulator (Operation S20).

In the HAC control method for vehicles in accordance with the present invention, a tilt of a vehicle in the pitch direction generated by a deceleration of the vehicle during braking may be additionally used and a difference between a gradient calculated from a sensed longitudinal acceleration value and the tilt of the vehicle in the pitch direction that corresponds to the deceleration of the vehicle may be used as an actual road gradient value. In other words, a corrected gradient value that corresponds to such a difference may be used to determine whether the vehicle enters HAC and calculation of a target braking pressure in HAC and, accordingly, the tilt of the vehicle in the pitch direction may be reflected, thereby effectively preventing malfunction of the HAC function. Particularly, malfunction of the HAC function, which is frequently generated when the vehicle restarts after sudden braking of the vehicle on a flat road, may be effectively prevented and thus problems caused by sensitive operation of the HAC function may be solved.

As is apparent from the above description, in a hill start assist control (HAC) method for vehicles in accordance with the present invention, HAC may be executed using a gradient, corrected by reflecting a tilt of a vehicle in the pitch direction in a gradient acquired from a value sensed by an acceleration sensor, as an input, thereby effectively preventing malfunction and sensitive operation of the HAC function on a flat road. Further, driver displeasure due to malfunction of the HAC function may be prevented and noise caused by malfunction of the HAC function, for example, noise caused by operation of a valve of an ESC hydraulic modulator or noise caused by friction between a disc and a pad, may be prevented. Moreover, instability of the vehicle due to malfunction of the HAC function may be prevented and the commercial value of the vehicle may be improved.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A hill start assist control (HAC) method for vehicles, comprising:
   acquiring, by a controller, vehicle state information in real time;
   determining, by the controller, whether a driver braking input is received based on the vehicle state information, wherein the controller is configured to determine whether the driver breaking input is received from a signal of a brake pedal switch as a brake pedal signal;
   calculating, by the controller, a braking deceleration of the vehicle generated by braking force from information regarding braking from the vehicle state information, in response to determining that the driver braking input is received;
   determining, by the controller, a tilt of the vehicle in the pitch direction that corresponds to the calculated braking deceleration;
   calculating, by the controller, a gradient of a road from a longitudinal acceleration signal of the vehicle from the vehicle state information;

correcting, by the controller, the road gradient, calculated from the longitudinal acceleration signal, using the tilt of the vehicle in the pitch direction, wherein the longitudinal acceleration signal is generated by an acceleration sensor;

determining, by the controller, whether HAC entrance conditions are satisfied using the corrected road gradient and the vehicle state information acquired in real time; and generating, by the controller, braking force to prevent the vehicle from moving backwards on a hill, in response to determining that the HAC entrance conditions are satisfied, wherein the controller is configured to adjust pressure of the wheel cylinders for generating the braking force to reach a target value through an electronic stability control (ESC) hydraulic modulator.

2. The hill start assist control method for vehicles of claim 1, wherein the calculation of the braking deceleration of the vehicle includes:

estimating, by the controller, braking forces of wheel brakes from braking pressures generated from wheel cylinders of the wheel brakes as the information regarding braking; and calculating, by the controller, braking decelerations during braking of the vehicle from the estimated braking forces of the wheel brakes.

3. The hill start assist control method for vehicles of claim 2, wherein the braking decelerations are calculated as mean values of vehicle decelerations for a time period from when the driver braking input is received or when a pressure of a master cylinder from the information regarding braking is generated to when wheel speeds detected by wheel speed sensors become 0.

4. The hill start assist control method for vehicles of claim 2, wherein the overall braking deceleration of the vehicle at the center of gravity of the vehicle calculated based on the estimated braking forces of the respective wheel brakes, the braking decelerations calculated from the braking forces of the wheel brakes and vehicle load distribution information is calculated as the braking deceleration of the vehicle to determine the tilt of the vehicle in the pitch direction.

5. The hill start assist control method for vehicles of claim 2, wherein the braking pressures are detected by pressure sensors installed at the wheel cylinders.

6. The hill start assist control method for vehicles of claim 2, wherein the braking pressures are estimated from a master cylinder pressure detected by a pressure sensor of a master cylinder.

7. The hill start assist control method for vehicles of claim 2, wherein the braking forces of the wheel brakes are calculated using wheel brake information including coefficients of friction of pads and radii of rotation of discs from the braking pressures generated from the wheel cylinders.

8. The hill start assist control method for vehicles of claim 1, wherein the tilt of the vehicle in the pitch direction is calculated from map data, in which pitch tilts according to mean braking decelerations are mapped.

9. The hill start assist control method for vehicles of claim 1, wherein, in the generation of braking force to prevent the vehicle from moving backwards, a braking pressure is calculated using the corrected road gradient, and wheel cylinder pressures of wheel brakes to generate the braking force are adjusted using the calculated braking pressure as a target value.

10. The hill start assist control method for vehicles of claim 1, wherein the HAC entrance conditions include a state in which the corrected road gradient is greater than a set value, a stopped state of the vehicle, and a state in which the driver braking input is released.

11. The hill start assist control method for vehicles of claim 1, wherein the corrected road gradient is calculated as a difference between the road gradient calculated from the longitudinal acceleration signal and the tilt of the vehicle in the pitch direction.

12. A hill start assist control (HAC) system for vehicles, comprising:

a memory configured to store program instructions; and
a processor configured to execute the program instructions, the program instructions when executed configured to:

acquire vehicle state information in real time;
determine whether a driver braking input is received based on the vehicle state information, wherein the processor is configured to determine whether the driver braking input is received from a signal of a brake pedal switch as a brake pedal signal;
calculate a braking deceleration of the vehicle generated by braking force from information regarding braking from the vehicle state information, in response to determining that the driver braking input is received;
determine a tilt of the vehicle in the pitch direction that corresponds to the calculated braking deceleration;
calculate a gradient of a road from a longitudinal acceleration signal of the vehicle from the vehicle state information;
correct the road gradient, calculated from the longitudinal acceleration signal, using the tilt of the vehicle in the pitch direction, wherein the longitudinal acceleration signal is generated by an acceleration sensor;
determine whether HAC entrance conditions are satisfied using the corrected road gradient and the vehicle state information acquired in real time; and
generate braking force to prevent the vehicle from moving backwards on a hill, in response to determining that the HAC entrance conditions are satisfied, wherein the processor is configured to adjust pressure of the wheel cylinders for generating the braking force to reach a target value through an electronic stability control (ESC) hydraulic modulator.

13. The hill start assist control system for vehicles of claim 12, wherein the program instructions for the calculation of the braking deceleration of the vehicle when executed are further configured to:

estimate braking forces of wheel brakes from braking pressures generated from wheel cylinders of the wheel brakes as the information regarding braking; and
calculate braking decelerations during braking of the vehicle from the estimated braking forces of the wheel brakes.

14. The hill start assist control system for vehicles of claim 13, wherein the braking decelerations are calculated as mean values of vehicle decelerations for a time period from when the driver braking input is received or when a pressure of a master cylinder from the information regarding braking is generated to when wheel speeds detected by wheel speed sensors become 0.

15. The hill start assist control system for vehicles of claim 13, wherein the overall braking deceleration of the vehicle at the center of gravity of the vehicle calculated based on the estimated braking forces of the respective wheel brakes, the braking decelerations calculated from the braking forces of the wheel brakes and vehicle load distribution information is calculated as the braking deceleration of the vehicle to determine the tilt of the vehicle in the pitch direction.

16. The hill start assist control system for vehicles of claim 13, wherein the braking pressures are detected by pressure sensors installed at the wheel cylinders.

17. The hill start assist control system for vehicles of claim 13, wherein the braking pressures are estimated from a master cylinder pressure detected by a pressure sensor of a master cylinder.

18. The hill start assist control system for vehicles of claim 13, wherein the braking forces of the wheel brakes are calculated using wheel brake information including coefficients of friction of pads and radii of rotation of discs from the braking pressures generated from the wheel cylinders.

19. The hill start assist control system for vehicles of claim 12, wherein the tilt of the vehicle in the pitch direction is calculated from map data, in which pitch tilts according to mean braking decelerations are mapped.

20. The hill start assist control system for vehicles of claim 12, wherein, in the generation of braking force to prevent the vehicle from moving backwards, a braking pressure is calculated using the corrected road gradient, and wheel cylinder pressures of wheel brakes to generate the braking force are adjusted using the calculated braking pressure as a target value.

* * * * *